United States Patent
Murphy

(10) Patent No.: US 10,717,111 B2
(45) Date of Patent: Jul. 21, 2020

(54) MECHANICALLY ADJUSTABLE VIBRATORY DRIVE SYSTEM

(71) Applicant: Terex GB Limited, Dungannon, County Tyrone (GB)

(72) Inventor: Glenn Murphy, Craigavon (GB)

( * ) Notice: Subject to any disclaimer, the term of this patent is extended or adjusted under 35 U.S.C. 154(b) by 0 days.

(21) Appl. No.: 16/420,275

(22) Filed: May 23, 2019

(65) Prior Publication Data

US 2019/0358674 A1 Nov. 28, 2019

(30) Foreign Application Priority Data

May 28, 2018 (GB) ..................................... 1808690

(51) Int. Cl.
| | |
|---|---|
| *B07B 1/46* | (2006.01) |
| *B07B 1/34* | (2006.01) |
| *B07B 1/44* | (2006.01) |
| *B65G 27/20* | (2006.01) |

(52) U.S. Cl.
CPC ............... *B07B 1/46* (2013.01); *B07B 1/343* (2013.01); *B07B 1/44* (2013.01); *B65G 27/20* (2013.01)

(58) Field of Classification Search
CPC .......... B65G 27/20; B06B 1/16; B06B 1/161; B06B 1/167; B07B 1/166; B07B 1/30; B07B 1/34; B07B 1/343; B07B 1/42; B07B 1/44
See application file for complete search history.

(56) References Cited

U.S. PATENT DOCUMENTS

| | | | | |
|---|---|---|---|---|
| 2,144,382 | A * | 1/1939 | Rockafield | ................ B06B 1/16 74/61 |
| 4,170,549 | A | 10/1979 | Johnson | |
| 9,039,324 | B2 | 5/2015 | Ackermann et al. | |
| 2018/0043396 | A1* | 2/2018 | Bellec | ................... B06B 1/161 |
| 2018/0178252 | A1* | 6/2018 | Serri | ....................... B06B 1/161 |
| 2018/0283503 | A1* | 10/2018 | Georgiev | ................. F16H 3/56 |
| 2019/0201935 | A1* | 7/2019 | Heeszel | .................... B06B 1/16 |

FOREIGN PATENT DOCUMENTS

| | | |
|---|---|---|
| CN | 205413596 U | 8/2016 |
| EP | 3338902 A1 | 6/2018 |
| FR | 2724854 A1 | 3/1996 |
| WO | 9947757 A1 | 9/1999 |
| WO | 02/11905 A1 | 2/2002 |

OTHER PUBLICATIONS

Intellectual Property Search Report for Application No. GB108690.0.
European Search Report dated Oct. 28, 2019, for EP 19175447, a foreign counterpart application.

* cited by examiner

*Primary Examiner* — Mark A Deuble
(74) *Attorney, Agent, or Firm* — Warner Norcross + Judd LLP

(57) ABSTRACT

A vibratory drive system comprises a rotatable drive shaft and an out-of-balance wheel that is coaxial with and rotatable relative to the drive shaft. A rotary transmission system couples the drive shaft to the wheel in order to transmit rotational movement of the drive shaft to the wheel. The rotary transmission system comprises a shaft gear, a wheel gear, and intermediate gears coupling the shaft gear to the wheel gear. The intermediate gears are carried by a gear carrier that is rotatable relative to the drive shaft, and are rotatable with respect to the gear carrier. The arrangement allows the phase angle of the out-of-balance wheel to be adjusted with respect to the drive shaft.

21 Claims, 6 Drawing Sheets

MECHANICALLY ADJUSTABLE VIBRATORY DRIVE SYSTEM

FIELD OF THE INVENTION

This invention relates to vibratory drive systems. The invention relates particularly to vibratory drive systems for material processing apparatus

BACKGROUND TO THE INVENTION

Vibratory drive systems may be used in many applications. In the field of material processing, for example, vibratory drive systems may be used in screening apparatus and in some feeders and conveyors.

By way of example, mechanical screening involves separating particulate material, such as rocks, sand, or other aggregate material, by particle size. Screening is used in a variety of industries including mining, quarrying, mineral processing, agriculture and recycling. A conventional screening apparatus comprises a body that carries one or more decks of screen media. A vibratory drive system is provided for vibrating the body and decks. A known type of vibratory drive system includes multiple, eccentrically weighted, rotatable shafts, mechanically coupled together and driven by a common motor. Each shaft carries an eccentrically mounted mass, and the respective angular positions of the masses define a phase angle between shafts. The coupled shafts may rotate the same direction or in opposite directions and cause the screening apparatus to vibrate linearly, circularly or elliptically. The characteristics of the vibrations depend on the direction of rotation of the shafts and on the phase angle between the shafts.

A problem with conventional drive systems is that the shafts are typically mechanically locked together by, for example, gears or timing belts. Adjusting the phase angle in order to adjust the vibration characteristics, requires significant down-time for the screening apparatus and any machine of which it is part, since the drive system must be stopped and at least partly dismantled to allow an operator to make the necessary mechanical reconfiguration.

It would be desirable therefore to provide a screening apparatus with an improved drive system.

SUMMARY OF THE INVENTION

From a first aspect the invention provides a vibratory drive system comprising:
  a first rotatable drive shaft having a rotational axis;
  an out-of-balance wheel located coaxially with said first rotatable drive shaft and being rotatable relative to said first drive shaft about said rotational axis;
  a rotary transmission system coupling the first drive shaft to the wheel in order to transmit rotational movement of the first drive shaft to the wheel,
  wherein said rotary transmission system comprises:
    a shaft rotary transmission component fixed with respect to said first drive shaft;
    a wheel rotary transmission component fixed with respect to said wheel;
    at least one intermediate rotary transmission component coupling the shaft rotary transmission component to the wheel rotary transmission component for transmitting rotation of the shaft rotary transmission component to the wheel rotary transmission component,
    wherein said at least one intermediate rotary transmission component is carried by a carrier that is rotatable relative to said first drive shaft about said rotational axis, and wherein said at least one intermediate rotary transmission component is rotatable with respect to the carrier.

Said at least one intermediate rotary transmission component may be provided in one or more sets, each set comprising two or more rotary transmission components.

Said at least one intermediate rotary transmission component may comprise a plurality of intermediate rotary transmission components circumferentially spaced apart, preferably substantially evenly spaced apart, around said shaft rotary transmission component.

Optionally, said intermediate rotary transmission components are provided in two or more spaced apart sets of two or more rotary transmission components.

In preferred embodiments, there are at least three intermediate rotary transmission components, or at least three sets of intermediate rotary transmission components, spaced apart around said shaft rotary transmission component.

Typically, in each set the rotary transmission components are coaxial and fixed with respect to each other for co-rotation with each other.

Preferably, said at least one intermediate rotary transmission component intermeshes with said shaft rotary transmission component and said wheel rotary transmission component.

In preferred embodiments, each set of rotary transmission components comprises a first rotary transmission component intermeshing with said shaft rotary transmission component, and a second rotary transmission component intermeshing with said wheel gear.

Advantageously, said at least one intermediate gear is revolvable around said shaft gear by rotation of said carrier with respect to said first drive shaft, and wherein said revolving causes rotation of said at least one intermediate rotary transmission component with respect to the carrier.

Typical embodiments include an operating mechanism for rotating the carrier relative to the first drive shaft. Said operating mechanism may comprise a handle, or other manual operating mechanism, for rotating the carrier. Optionally said operating mechanism comprises a powered actuator for rotating the carrier.

In typical embodiments, the drive system includes at least one other out-of-balance rotating drive shaft. Said first drive shaft and said at least one other out-of-balance drive shaft are typically coupled together by a mechanical coupling mechanism for transmitting rotation of at least one of said drive shafts to at least one other of said drive shafts. Said at least one other out-of-balance drive shaft may comprise a second out-of-balance drive shaft, wherein said mechanical coupling mechanism being configured to transmit rotation of one of said first and second drive shafts to the other of said first and second drive shafts. Said mechanical coupling mechanism may be configured to cause said first and second shafts to rotate in the same direction or in opposite directions.

Said rotary transmission system may be configured to cause said wheel to rotate in the opposite direction to said first drive shaft.

Preferred embodiments include a drive mechanism coupled directly or indirectly to said first drive shaft for rotating the first drive shaft. A drive mechanism may be coupled to at least a driven one of said drive shafts for rotating the driven drive shaft.

In preferred embodiments said rotary transmission system comprises a gear system in which said shaft rotary transmission component comprises a shaft gear fixed with respect to said first drive shaft; said wheel rotary transmission component comprises a wheel gear fixed with respect to said wheel; said at least one intermediate rotary transmission component comprises at least one intermediate gear coupling the shaft gear to the wheel gear for transmitting rotation of the shaft gear to the wheel gear.

A second aspect of the invention provides a material processing apparatus comprising at least one vibrating component and a vibratory drive system for vibrating said at least one vibrating component, wherein said drive system comprises a first rotatable drive shaft having a rotational axis;
  an out-of-balance wheel located coaxially with said first rotatable drive shaft and being rotatable relative to said first drive shaft about said rotational axis;
  a rotary transmission system coupling the first drive shaft to the wheel in order to transmit rotational movement of the first drive shaft to the wheel,
  wherein said rotary transmission system comprises:
    a shaft rotary transmission component fixed with respect to said first drive shaft;
    a wheel rotary transmission component fixed with respect to said wheel;
    at least one intermediate rotary transmission component coupling the shaft rotary transmission component to the wheel rotary transmission component for transmitting rotation of the shaft rotary transmission component to the wheel rotary transmission component,
  wherein said at least one intermediate rotary transmission component is carried by a carrier that is rotatable relative to said first drive shaft about said rotational axis, and wherein said at least one intermediate rotary transmission component is rotatable with respect to the carrier.

Said at least one vibrating component may comprise at least one screen.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
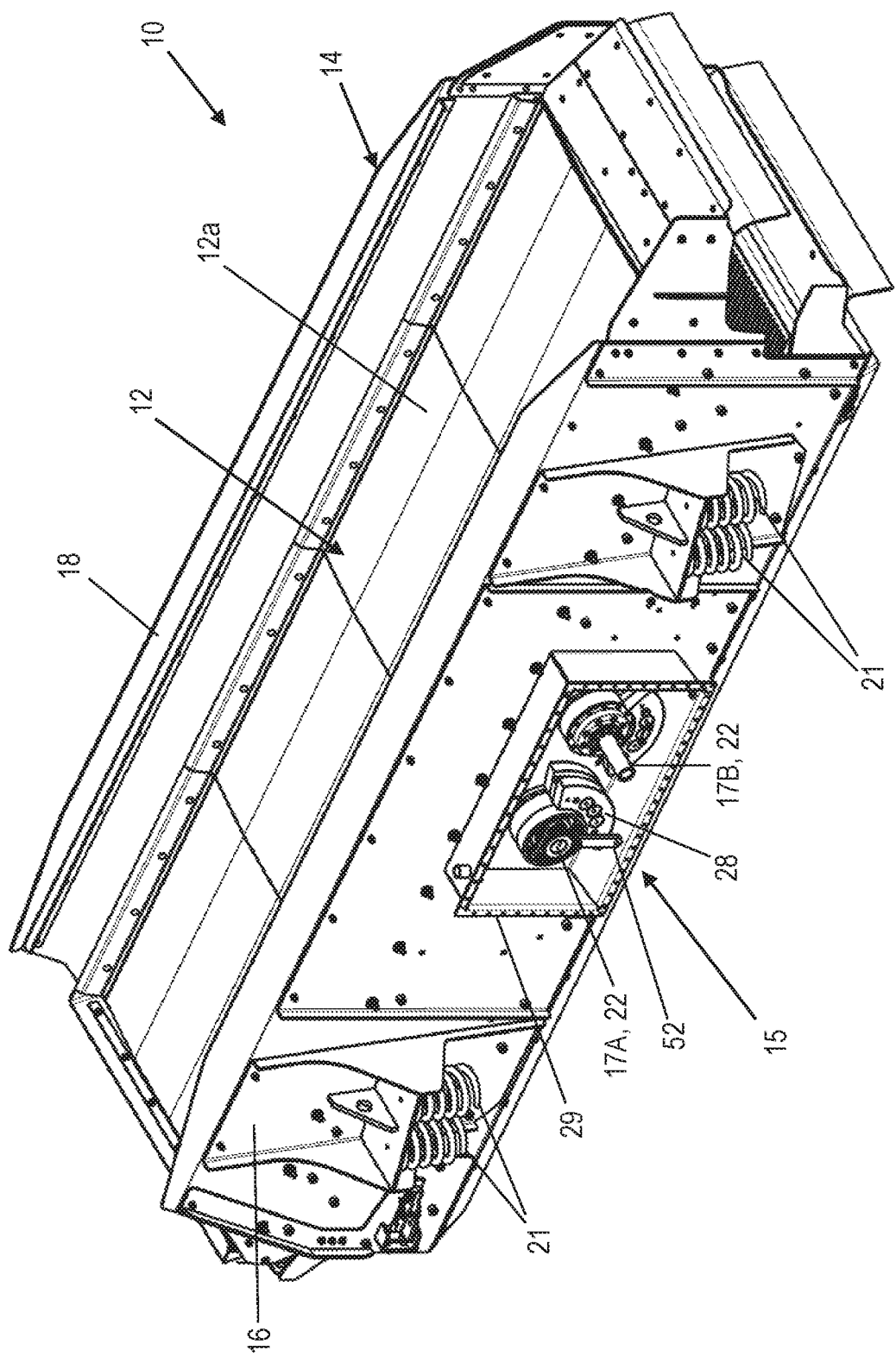
FIG. 1 is a perspective view of a screening apparatus embodying one aspect of the invention, including a drive system embodying another aspect of the invention.

Referring now to the drawings there is shown, generally indicated as 15, a vibratory drive system embodying one aspect of the invention. In the illustrated embodiment, the drive system 15 is part of a material screening apparatus 10. The screening apparatus 10 is of a type suitable for use in separating particulate material, e.g. sand, stones, rocks or other aggregate material or recyclable material, according to size. It will be understood that drive systems embodying the invention are not limited to use with screening apparatus, and may alternatively be used in other applications, including with other material processing apparatus such as vibrating conveyors and vibrating feeders.

The screening apparatus 10 comprises a body 14 for carrying one or more material screens 12a. The screens are typically provided in one or more screening decks 12 between opposing side walls 16, 18 of the body 14. In typical embodiments, the body 14 is box-like in form, although it may comprise any supporting structure that is shaped and dimensioned to carry one or more screening decks 12. Typically at least one end of the body 14 is open to allow screened material to be removed from the screening apparatus 10, for example by a conveyor (not shown). The screens may take any conventional form, for example comprising bars, a mesh, a cloth or a grid.

Figure 6:
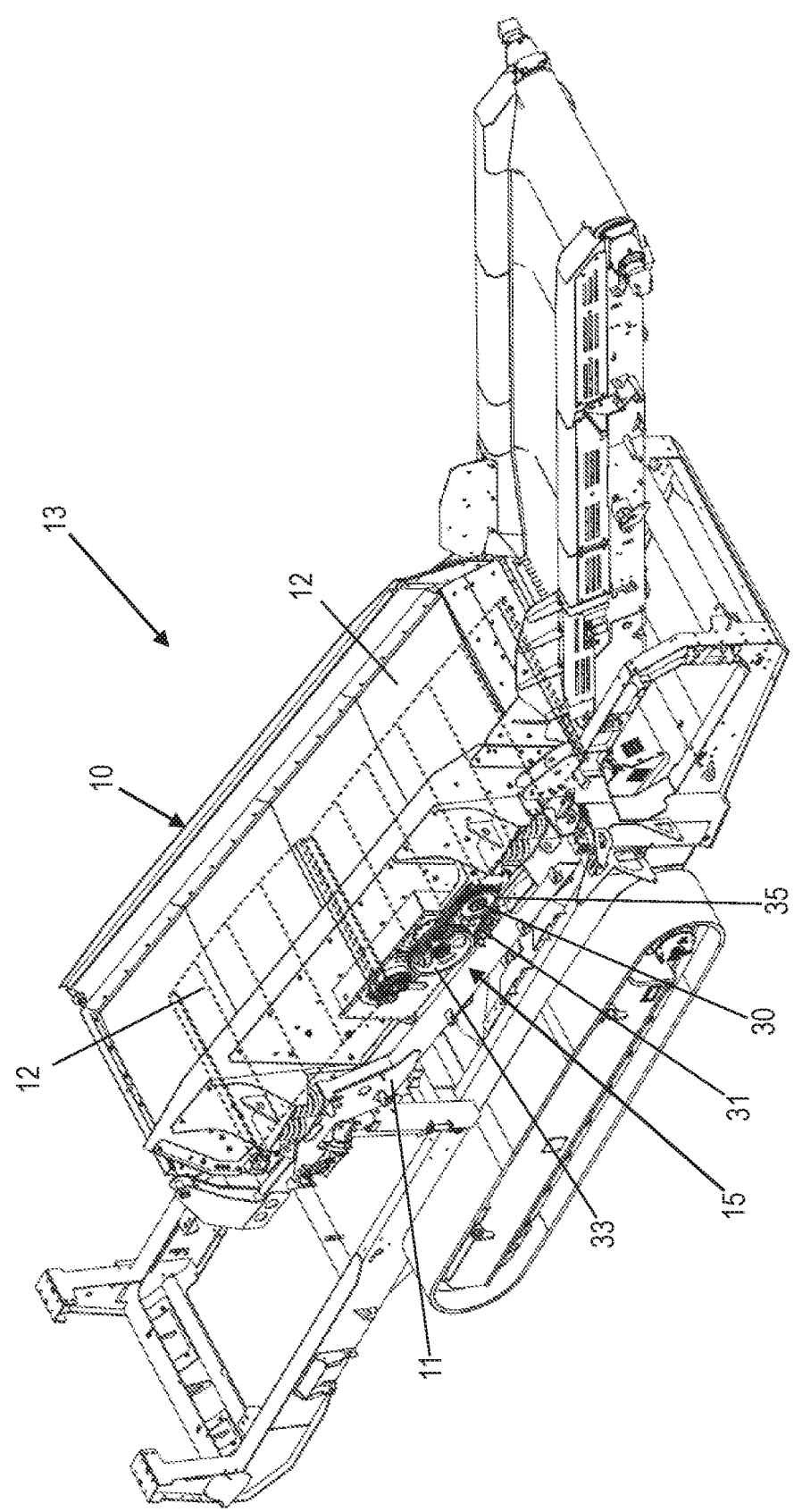
FIG. 6 is a perspective view of the screening apparatus of FIG. 1 incorporated into a material processing apparatus.

In use, the screening apparatus 10 is mounted on a base 11 (FIG. 6), which may for example be part, e.g. the chassis, of a material processing system 13 of which the apparatus 10 is part. The screening apparatus 10 is mounted on the base 11 by a suspension system which, in the illustrated embodiment, comprises springs 21, to allow relative movement between the screening apparatus 10 and the base 11. The material processing system 13 may take various forms, for example including any one or more of: one or more conveyors for conveying material to or from the apparatus 10, a feeder, and/or other material processing apparatus. It will be understood that, in embodiments where the drive system 15 is incorporated into another type of material processing apparatus other than a screening apparatus, the material process apparatus may be similarly mounted on the base 11 by a suspension system.

In use, the vibratory drive system 15 causes the screening apparatus 10 to vibrate. The drive system 15 is coupled to the body 14 in order to vibrate the body 14. The vibration causes the screen(s) (and/or other vibrating component(s) depending on the embodiment) carried by the body 14 to vibrate. The drive system 15 comprises at least two drive shafts 17 (only one visible in FIG. 2), which are preferably but not necessarily parallel with each other. In the illustrated embodiment, the screening apparatus 10 has two drive shafts 17A, 17B, a respective end 22 of each shaft 17A, 17B being visible in FIGS. 1, 4 and 5. In alternative embodiments (not illustrated) there may be three or more drive shafts. Each shaft 17 may extend across the body 14, between the side walls 16, 18. The shafts 17 may be perpendicular with the walls 16, 18 but may alternatively be oblique with respect to the walls 16, 18. Alternatively still, the shafts 17 may extend longitudinally of the body 14 (parallel or non-parallel with the walls 16, 18) for example being mounted between the ends of the body 14, or mounted on one or each side 16, 18 of the body 14. In such cases the shafts need not be elongate; but they are rotatable in order to provide rotating out-of-balance masses. The shafts 17 are rotatable about their longitudinal axis, which typically is disposed transversely of the body 14. The shafts 17 are spaced apart in the longitudinal or transverse direction of the body 14 as applicable. The shafts 17 may be at the same horizontal level (as in the illustrated embodiment) or at different horizontal levels.

Figure 2:
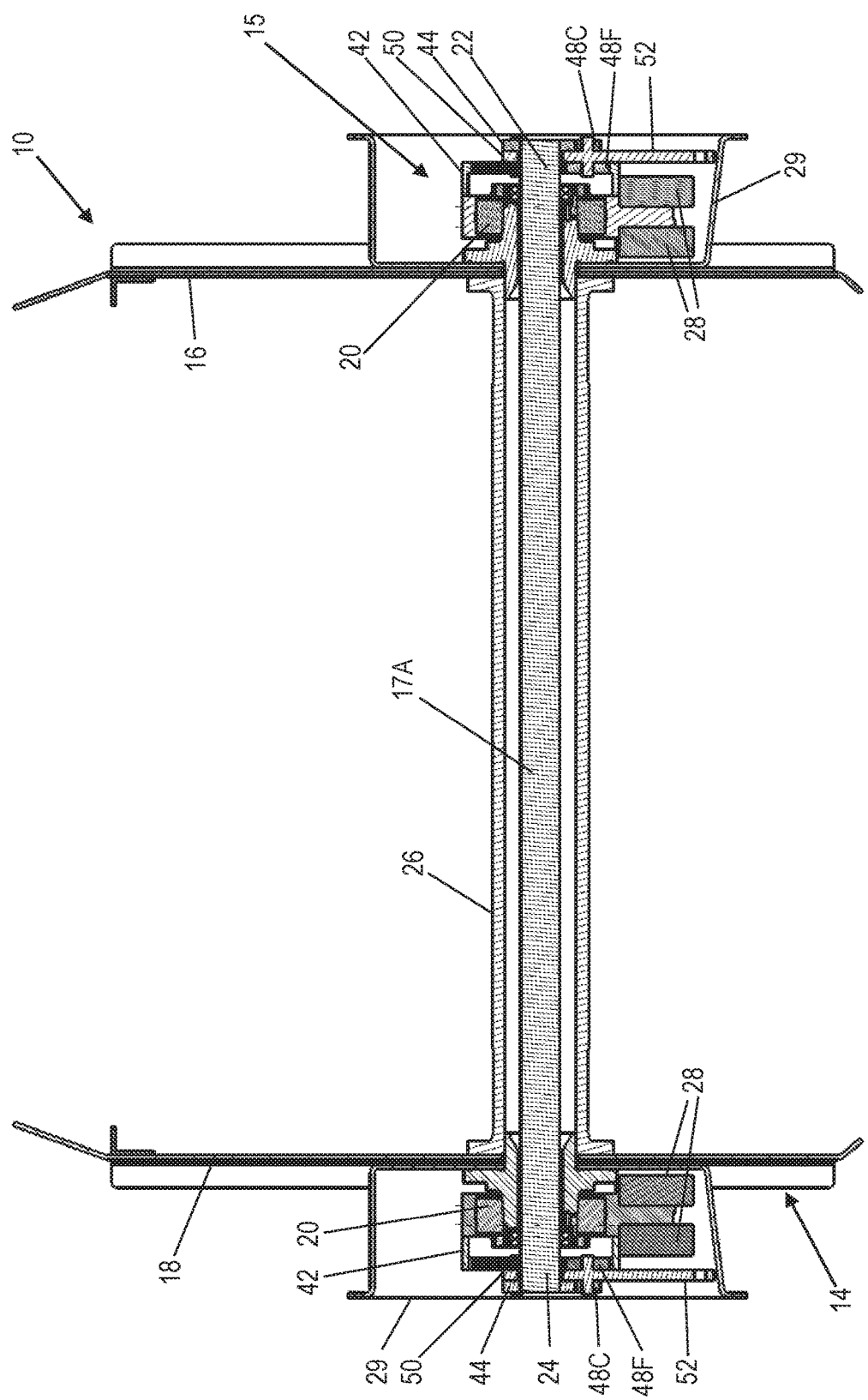
FIG. 2 is a sectioned end view of the screening apparatus and the drive system of FIG. 1.

Typically, each shaft 17 is mounted on the body 14 by a respective bearing 20 at each end 22, 24 of the shaft 17. In the illustrated embodiment, the ends 22, 24 of each shaft 17 pass through a respective aperture provided in the respective side wall 16, 18. The respective bearing 20 is conveniently mounted in the respective side wall 16, 18 and fits around the respective end 22, 24 of the shaft 17 to allow the shaft 17 to rotate axially. Preferably, the portion of each shaft 17 that is located between the walls 16, 18 is located within an enclosure 26, which in the illustrated example comprises a tube. The enclosure 26 may be supported by the same structures that provide or include the bearing 20. Although only one shaft 17 and associated components is shown in FIG. 2, the other shaft(s) 17 may be the same or similar unless otherwise indicated.

Each shaft 17 is eccentrically weighted, i.e. the mass of the shaft 17 (including any object carried by the shaft as it rotates) is not evenly distributed around the shaft's rotational axis. As such, each shaft 17 may be described as an "out-of-balance" rotatable shaft, in that its center of mass (or inertia axis) is out of alignment with its center of rotation (or geometric axis). Conveniently, in order to unbalance the shaft in this way, each shaft 17 carries one or more mass 28 (or weight). The or each mass 28 is eccentrically located with respect to the rotational axis of the shaft 17 in order to unbalance the rotation of the shaft 17. In this example, each shaft 17 carries a respective mass 28 at each end 22, 24. Where a shaft 17 carries more than one mass 28, the masses 28 are preferably angularly aligned with each other about the rotation axis of the shaft 17. In alternative embodiments, one or more mass may be provided at one end of the shaft only.

To synchronize the shafts 17, the shafts 17 may be mechanically coupled together by a coupling mechanism comprising, for example, by any one or more of a gear system, intermeshing teeth, a timing belt or chain, or other suitable conventional mechanical linkage. During use, the mechanical coupling may fix the relative direction of rotation of the shafts 17, the relative speed of the shafts 17 and/or the relative phase of the shafts 17. In the illustrated embodiment, the coupling mechanism is provided as a respective annular set of teeth 19A, 19B (shown in FIGS. 4 and 5 but not in FIG. 1), which intermesh so that rotation of one shaft 17B, 17A causes the other shaft 17A, 17B to rotate (in the opposite direction). In typical embodiments, the shafts 17 rotate at the same speed. In alternative embodiments, the shafts 17 may be configured and/or coupled to each other such that they rotate at different speeds. In such cases, the phase relationship between shafts may not be fixed, but it follows a cyclical pattern, i.e. there is still a fixed timing relationship (synchronization) for the rotation of the shafts 17.

Simultaneous rotation of the eccentrically weighted shafts 17 causes the screening apparatus 10 to move (vibrate) with respect to the base 11. Any one or more of the respective rotational phase, rotational direction and speed of the shafts 17 determine the type of vibratory movement that is caused (e.g. linear vibrations or orbital (e.g. circular or elliptical) vibrations). For example, counter rotating shafts cause linear or elliptical vibration, while co-rotating shafts cause circular vibration. The phase angle between counter-rotating shafts determines the angle of linear or elliptical vibration. The phase angle of co-rotating shafts determines the total combined size of the circular vibration. For example in a two shaft equal speed counter-rotating system, equal out of balance shafts results in a linear stroke, while dissimilar out of balance shafts results in an elliptical motion. In the case of an three-shaft equal speed shaft system, out of balance on each shaft can be the same, two shafts may rotate clockwise and one shaft may rotate counter-clockwise, the resulting difference in combined out of balance in each rotation direction results in an elliptical motion. Other characteristics of the vibration (e.g. specific shape, amplitude and acceleration) depend on the rotational speed of the shafts 17 (which may be the same or different) and on the phase (angular) difference between the shafts 17, as is described in more detail below.

Figure 3:
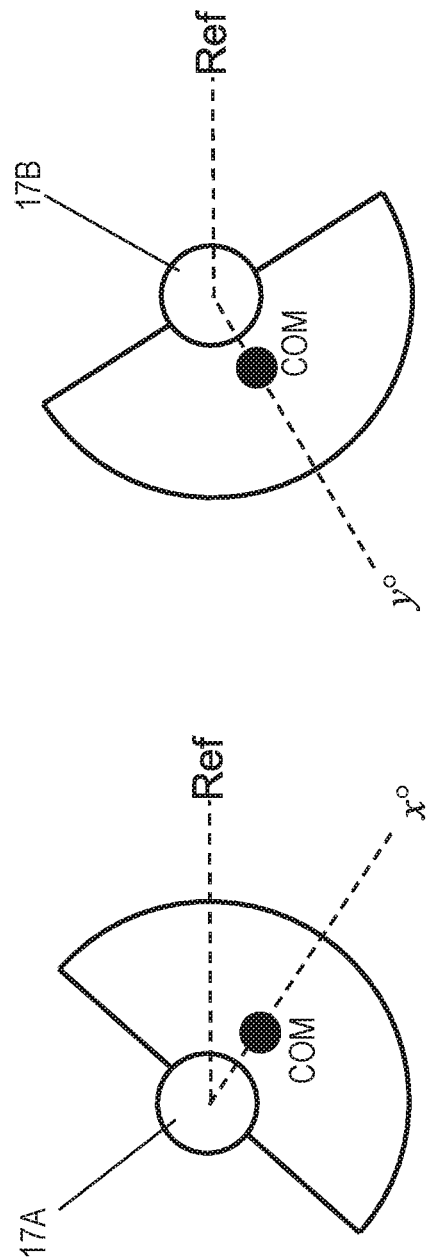
FIG. 3 is a schematic end view of first and second drive shafts.

Referring in particular to FIG. 3, first and second drive shafts 17A, 17B are shown schematically in end view with respective masses 28. The center of mass (COM) of each shaft 17A, 17B is offset (linearly) from the respective rotational axis of the respective shaft 17A, 17B, causing each shaft to be rotationally out-of-balance. The angular position of the respective COM of each shaft 17A, 17B with respect to a reference angle Ref may be referred to as the rotational phase, or just phase, of the shaft 17A, 17B. In the illustrated example, shaft 17A is displaced by $x°$ from the reference angle, while shaft 17B is displaced by $y°$ from the reference angle. The angle of displacement from the reference angle may be referred to as the phase angle. The difference between the respective phase angles of any two shafts may be referred to as the phase difference, or phase difference angle, between the shafts. In the present example, the phase difference angle (which may also be referred to as the relative phase angle) between shafts 17A and 17B is $y°-x°$. The phase difference angle between any two or more shafts is maintained as long as the respective shafts 17 rotate at the same speed. The phase difference angle changes when the relative rotational speed of the respective shafts 17 changes. The phase difference between the shafts 17A, 17B affects the characteristics of the vibration caused by the drive system 15. For example, in cases where the shafts 17A, 17B rotate in the same direction, the phase difference angle between the shafts 17A, 17B determines the size (amplitude) of the circular vibration. In cases where the shafts 17A, 17B rotate in opposite directions, the phase difference angle determines the angle of the linear or elliptical vibration. In this connection, the angle of linear/elliptical vibration is the angle of the major axis of the resulting screen motion relative to the screen coordinate system. Although only two drive shafts are shown in FIG. 1, it will be understood that, more generally, each one of any number of multiple drive shafts may be in phase or out of phase with one or more of the other drive shafts depending on the respective phase angle of the shafts.

The drive system 15 includes a drive mechanism for rotating the drive shafts 17. In preferred embodiments, the drive mechanism comprises a motor 30 (shown in FIG. 6 but not in FIG. 1) coupled to one of the drive shafts (the driven shaft), the other shaft(s) 17 being rotated by the coupling mechanism 19A, 19B between the shafts 17. The motor 30 may be a hydraulic motor, but may alternatively be of any other conventional type, e.g. electric or pneumatic motors, or an engine. Optionally, the motor 30 is mounted on an end of the driven drive shaft 17. As such, the motor 30 may be coupled to the driven shaft to provide direct drive to the shaft, i.e. without any reductions as would be caused by a gear system. Alternatively, the motor 30, or other drive mechanism, may be coupled to the driven shaft 17 by any conventional drive coupling, e.g. comprising a gear system, a drive chain or belt and/or a pulley system (not shown). In the illustrated embodiment, the drive coupling comprises a drive belt 31 and pulley wheels 33, 35. In this example, shaft 17B is the driven shaft. The driven shaft 17B drives the other shaft 17A by means of the coupling mechanism 19A, 19B, which in this example comprise the annular sets of intermeshing teeth. The teeth or other coupling mechanism 19A, 19B may be provided around the circumference of any convenient component of the respective shaft 17A, 17B (including any component carried by the shaft 17A, 17B).

Depending on the embodiment, the drive mechanism (by itself or in combination with any coupling between it and the driven shaft, as applicable) may be capable of rotating the driven shaft 17 in one direction only, or in either one of both rotational directions (e.g. it may comprise a uni-directional or bi-directional motor), and at a fixed or variable speed.

In the illustrated embodiment, a respective housing 29 for covering each end 22, 24 of each shaft 17A, 17B. Preferably the housings 29 cover the respective masses 28.

Figure 4:
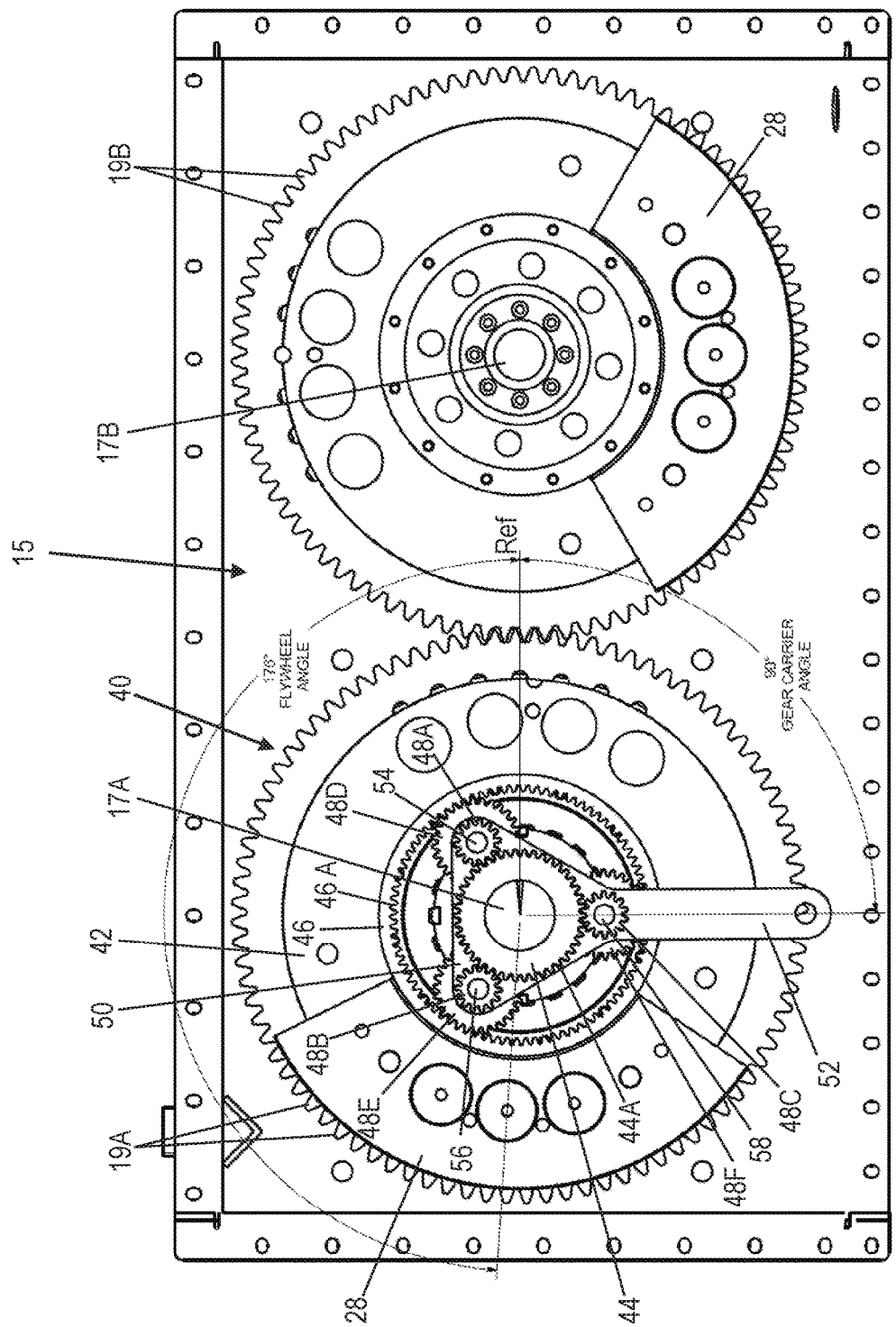
FIG. 4 is an end view of an embodiment of the drive system in a first configuration.
Figure 5:
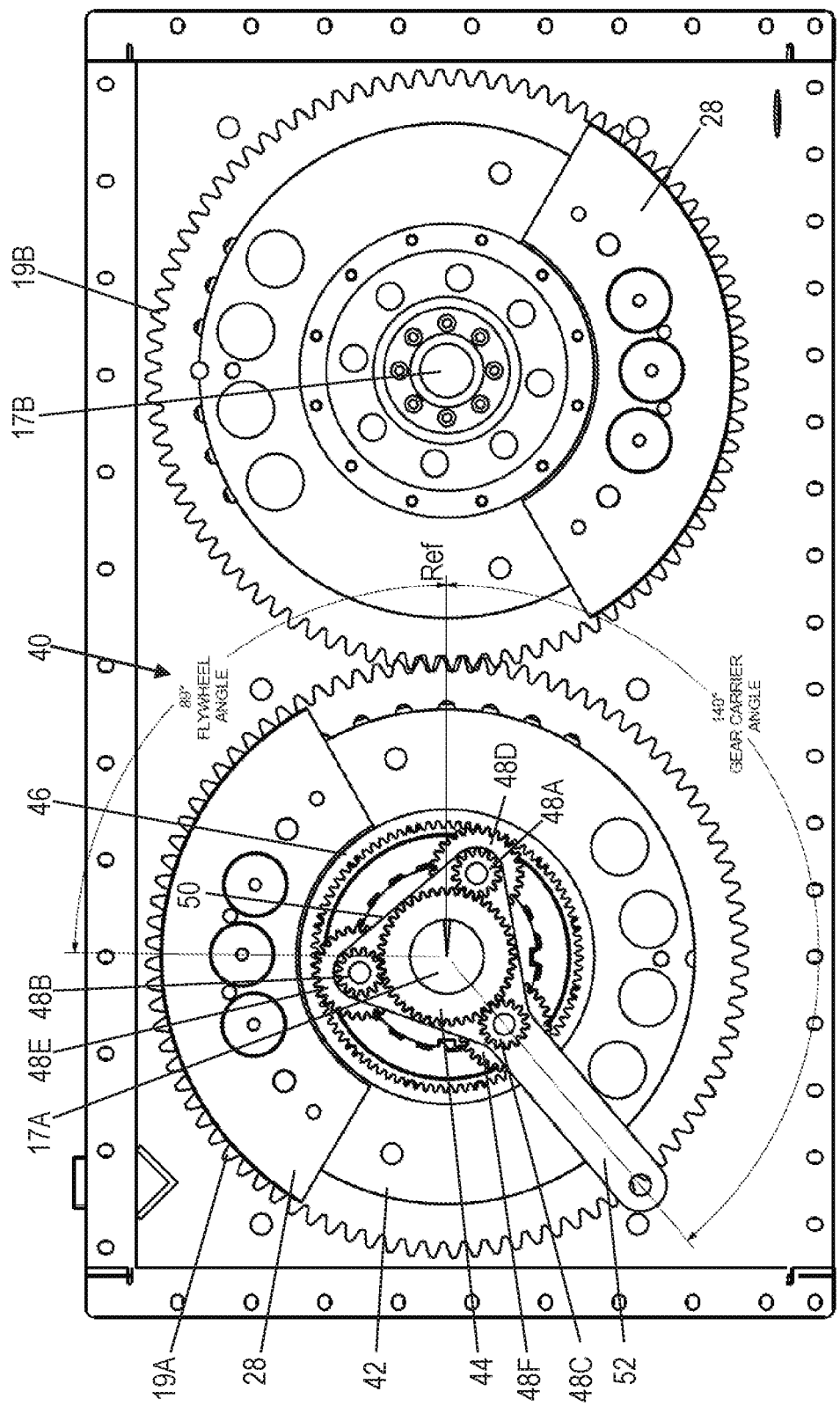
FIG. 5 is an end view of the drive system of FIG. 4 in a second configuration.

Referring now in particular to FIGS. 4 and 5, the drive system 15 includes a phase adjustment mechanism 40 for adjusting the phase angle of at least one of the shafts 17. In the illustrated embodiment, only the first shaft 17A is provided with a phase adjustment mechanism, although in alternative embodiments, more than one, or each, shaft 17 may be provided with a respective phase adjustment mechanism. In the present example, the phase angle of the second shaft 17B is assumed to be fixed during use (although it may be adjusted by conventional methods when the screening apparatus 10 is not in use). Therefore changing the phase angle of the first shaft 17A changes the phase difference angle between the shafts 17A, 17B. More generally, the drive system 15 includes at least one phase adjustment mechanism 40 for adjusting the phase of a respective shaft 17, advantageously so that the phase difference angle(s) between at least two shafts 17 can be changed.

The phase adjustment mechanism 40 comprises an eccentrically weighted, or out-of-balance, wheel 42 (which may be referred to as a flywheel) that is co-axial with the shaft 17A and which is rotatable with respect to the shaft 17A such that the wheel 42 and the shaft 17A have an adjustable angular relationship. As a result, the phase angle of the wheel 42 may be adjusted independently of the shaft 17A. In order to make it out-of-balance (i.e. such that its center of mass (or inertia axis) is out of alignment with its center of rotation (or geometric axis)), the wheel 42 carries the eccentrically located mass(es) 28. In typical embodiments, the, or each, mass 28 is removable from the wheel 42, and is optionally removably mountable on the wheel 42 in any one of a plurality of angular locations. In alternative embodiments (not illustrated) the wheel 42 may be made out-of-balance in any other convenient manner, e.g. by uneven distribution of the mass of the wheel itself.

The wheel 42 is coupled to the shaft 17A by a rotary transmission system that transmits rotational movement of the shaft 17A to the wheel 42, thereby causing the wheel 42 to rotate as the shaft 17A rotates. However, the rotary transmission system is also configured to permit relative rotational movement between the wheel 42 and the shaft 17A.

Conveniently, the rotary transmission system comprises a gear system comprising a plurality of rotary transmission components in the form of gears. The preferred gear system comprises a shaft gear 44 fixed with respect to the shaft 17A such that it rotates with the shaft 17A. The shaft gear 44 is typically annular and co-axial with the shaft 17A. The shaft gear 44 has an annular outer toothed surface 44A. The shaft gear 44 may be fixed directly or indirectly to the shaft 17A, or integrally formed with the shaft 17A as is convenient. The preferred gear system 44 includes a wheel gear 46 fixed with respect to the wheel 42 such that it rotates with the wheel 42. The wheel gear 46 is typically annular and co-axial with the wheel 42. The wheel gear 46 has an annular inner toothed surface 46A. The wheel gear 46 may be fixed directly or indirectly to the wheel 42, or integrally formed with the wheel 42, as is convenient. Conveniently, the toothed surface 46A is provided on an inner annular surface of the wheel 42.

In preferred embodiments, the gear system 44 includes at least one intermediate, or idler, gear 48A-48F coupling the shaft gear 44 to the wheel gear 46, typically being located between the shaft gear 44 and the wheel gear 46. The, or each, idler gear 48A-48F is rotatable about an axis, or respective axis, that is parallel with the rotational axis of the shaft 17A. The idler gear(s) 48A-48F intermesh with the shaft gear 44 and the wheel gear 46 so that rotation of the shaft 17A is transmitted to the wheel 42. Each idler gear 48A-48F typically has an annular toothed outer surface for intermeshing with a corresponding surface of the shaft gear 44 and the wheel gear 46.

The, or each, idler gear 48A-48F is carried by a gear carrier 50 and is rotatable with respect to the gear carrier 50. The gear carrier 50 is rotatable about the axis of rotation of the shaft 17A, and conveniently includes an operating mechanism in the preferred form of a handle 52. The gear carrier 50 may be held in position by engagement of the idler gear(s) 48A-48F with the shaft and wheel gears 44, 46, and/or may be rotatably mounted on the shaft 17A in any convenient manner. The gear carrier 50 may take any suitable form, e.g. comprising a plate or bracket.

In preferred embodiments, a plurality of idler gears 48A-48F are provided, circumferentially spaced apart, preferably substantially evenly spaced, around the shaft gear 44 and the wheel gear 46. In a preferred embodiment, and as illustrated, there are three sets of idler gears, the sets being spaced apart, preferably substantially evenly, around the circumference of the shaft gear 46 and the wheel gear 46. Each set comprises a first gear 48A, 48B, 48C and a second gear 48D, 48E, 48F. The gears in each set are connected to each other, preferably coaxially, for co-rotation with each other, e.g. on a common axle 54, 56, 58. Each idler gear 48A-48F is rotatable with respect to the gear carrier 50. In preferred embodiments the axle 54, 56, 58 of each idler gear set is rotatable with respect to the carrier 50 thereby allowing the respective idler gears to rotate. In alternative embodiments, there may be more or fewer idler gear sets, and/or more or fewer gears in each set. Preferably the sets of gears are configured to provide a gearing that causes the shaft 17A and the out-of-balance mass 28 rotate at the same speed. For example, in the illustrated embodiment, the first and second gears of each set are of different diameters, the resulting gearing being such that the shaft 17A and the out-of-balance mass 28 rotate at the same speed. More particularly, in the illustrated embodiment, the shafts 17A, 17B counter-rotate at the same speed and it is desired that the out of balance masses 28 do so also. The adjustment mechanism 40 is only provided for shaft 17A and so to maintain equal speeds for the counter rotating out of balance masses 28 a 1:1 gear ratio needs to be maintained between shaft 17A and wheel 42. The relative diameter of the gears 48A, 48D are selected to maintaining the desired gear ratio, preferably also satisfying packaging constraints and power transmission requirements.

In preferred embodiments, the first idler gear 48A, 48B, 48C of each set intermeshes with the shaft gear 44, and the second idler gear 48D, 48E, 48F of each set intermeshes with the wheel gear 46. To facilitate this, the shaft and wheel gears 44, 46 may be spaced apart in the axial direction, the first and second idler gears of each set being correspondingly spaced apart. Conveniently, the first 48A, 48B, 48C of each set is located on one side of the gear carrier 50 and the second gear 48D, 48E, 48F are located on the other side of the carrier 50, i.e. the carrier 50 is located between the first and second idler gears. Typically, the first idler gears 48A, 48B, 48C are of the same diameter, and the second idler gears 48D, 48E, 48F are of the same diameter. The first idler gears may have the same or a different diameter than the second idler gears. In preferred embodiments, the second idler gears have a larger diameter than the first idler gears.

Conveniently, the phase adjustment mechanism 40 is located at an end 22, 24 of the shaft 17A. In embodiments where the shaft 17A is eccentrically weighted at each end 22, 24, a respective phase adjustment mechanism 40 may be provided at each end 22, 24 of the shaft 17A. In typical embodiments, the angular position of the respective mass 28 at each end of the same shaft is the same. i.e. the masses are aligned with one another, but this is not essential.

In use, the shaft 17A may be rotated directly or indirectly by the motor 30 or drive mechanism, or by the coupling between the shafts 17A, 17B as applicable. In the illustrated embodiment, it is assumed that the shaft 17B is the driven shaft, and that the shaft 17A is coupled to the driven shaft (by teeth 19A, 19B in this example) and is rotated thereby. In alternative embodiments, the shaft 17A may be the driven shaft and may be coupled to shaft 17B to drive shaft 17B. In the illustrated embodiment, the coupling between the shafts 17A, 17B is such that it causes each shaft 17A, 17B to rotate in the opposite direction. In the illustrated embodiment, the gear system translates counter rotation of the shafts 17A, 17B into co-rotation of the wheel 42 with respect to the shaft 17B. In alternative embodiments, the shafts 17 may rotate in the same direction, e.g. in embodiments where the shafts 17A, 17B are coupled together using pulleys, chains and/or sprockets rather than annular gears 19A, 19B.

When the shaft 17A rotates, the shaft gear 44 rotates with it and causes the idler gears 48A-48F to rotate with their respective axle 54, 56, 58. Rotation of the idler gears 48A-48F causes the wheel 42, and the out-of-balance mass 28, to rotate about the shaft axis by rotation of the wheel gear 46. Hence the shaft 17A is an out-of-balance shaft as described above. It is noted that in this mode of operation, the gear carrier 50 does not rotate, and the wheel 42 and shaft 17A rotate simultaneously.

The phase angle of the shaft 17A can be adjusted by rotating the idler gear carrier 50 with respect to the shaft 17A. Such rotation of the carrier 50 causes the idler gears 48A-48F to revolve around the shaft gear 44, which in turn causes the idler gears 48A-48F to rotate with their respective axle 54, 56, 58. Rotation of the idler gears 48A-48F rotates the wheel 42 about the shaft axis via the wheel gear 46. As a result, the wheel 42, and the mass 28, are rotated relative to the shaft 17A thereby changing the phase angle of the shaft 17A. It is noted that in this mode of operation, the shaft 17A may be not rotating (e.g. when the vibratory drive system 15 is stopped), or rotating (e.g. when the drive system 15 is operating). Rotation of the gear carrier 50 is conveniently performed manually using the handle 52 or other manual operating mechanism. Alternatively, or in addition, any conventional actuating device may be provided for rotating the gear carrier 50 with respect to the shaft 17A. The actuating device may be power-operated, e.g. comprising a power operated rotary actuator, and may be operable from a remote location by any convenient wired or wireless control link.

Adjusting the phase angle of the shaft 17A is illustrated by comparison of FIGS. 4 and 5, in which it may be assumed that the shaft 17A is not rotating. In FIG. 4, the phase angle of the shaft 17A with respect to a reference angle Ref is indicated as the "FLYWHEEL ANGLE", and is given as 176° by way of example only. The corresponding angular position of the gear carrier 50 is represented by the "GEAR CARRIER ANGLE", which is measured, for convenience, as the angle between the handle 52 and the reference angle Ref, and is given as 90° by way of example only. In FIG. 5, it is assumed that the gear carrier 50 has been rotated relative to the shaft 17A such that the "GEAR CARRIER ANGLE" has changed (to 140° in this example). This change causes the wheel 42 and mass 28 to rotate relative to the shaft 17A thereby changing the "FLYWHEEL ANGLE" (to 89° in this example), thereby changing the phase angle of the shaft 17A.

It will be apparent from the foregoing that the phase adjustment mechanism 40 allows the phase angle of the shaft 17B to be changed, and so allows the relative phase angle between the shaft 17A and the (or each) other shaft 17B to be adjusted. Moreover, this adjustment may be performed without having to dismantle and reconfigure the vibratory drive system 15. As a result the vibration characteristics imparted by the vibratory drive system 15 can be quickly and easily adjusted.

In this example, it is assumed that the eccentric mass 28 of the second shaft 17B is not adjustable with respect to the shaft 17B. In alternative embodiments, the phase adjustment mechanism 40 may be provided on the shaft 17B as well as, or instead of, the shaft 17A.

While embodiments of the phase adjustment mechanism 40 are particularly suited for use in vibratory drive systems with multiple rotating shafts, they may also be used with single shaft vibratory drive systems, e.g. to generate a couple around a single shaft assembly.

In alternative embodiments (not illustrated), the rotary transmission system may comprise other rotary transmission components instead of, or as well as, gears. For example, friction wheels and/or rollers may be used, i.e. wheels or rollers whose annular surfaces engage and transmit rotational movement via friction between the engaged wheels/rollers. Alternatively, or in addition, the rotary transmission components may have annular engagement surfaces that have complementary male and female formations (other than the gear teeth illustrated) such as sprockets, spurs, recesses or pits, as applicable. For example, for any two engaging rotary transmission components, one may comprises a sprocket and the other may be provided with a complementary chain around its annular engaging surface. With reference to the preferred rotary transmission system shown in FIGS. 4 and 5, any one or more of the gears may be replaced with any suitable alternative form of rotary transmission component. For example, all of the gears 44, 46, 48 may be replaced with a respective friction wheel, roller or annular surface; or gears 48 may be provided as respective sprockets, while gears 44, 46 may be provided as corresponding annular chains.

The invention is not limited to the embodiment(s) described herein but can be amended or modified without departing from the scope of the present invention.

The invention claimed is:

1. A vibratory drive system comprising:
    a first rotatable drive shaft having a rotational axis;
    an out-of-balance wheel located coaxially with said first rotatable drive shaft and being rotatable relative to said first drive shaft about said rotational axis;
    a rotary transmission system coupling the first drive shaft to the wheel in order to transmit rotational movement of the first drive shaft to the wheel,
    wherein said rotary transmission system comprises:
        a shaft rotary transmission component fixed with respect to said first drive shaft;

a wheel rotary transmission component fixed with respect to said wheel;

at least one intermediate rotary transmission component coupling the shaft rotary transmission component to the wheel rotary transmission component for transmitting rotation of the shaft rotary transmission component to the wheel rotary transmission component, wherein said at least one intermediate rotary transmission component is carried by a carrier that is rotatable relative to said first drive shaft about said rotational axis, and wherein said at least one intermediate rotary transmission component is rotatable with respect to the carrier, and wherein the vibratory drive system further includes an operating mechanism for rotating the carrier relative to the first drive shaft.

2. The drive system of claim 1, wherein said at least one intermediate rotary transmission component is provided in one or more sets, each set comprising two or more rotary transmission components.

3. The drive system of claim 1, wherein said at least one intermediate rotary transmission component comprises a plurality of intermediate rotary transmission components circumferentially spaced apart around said shaft rotary transmission component.

4. The drive system of claim 3, wherein said intermediate rotary transmission components are provided in two or more spaced apart sets of two or more rotary transmission components.

5. The drive system of claim 3, wherein there are at least three intermediate rotary transmission components, or at least three sets of intermediate rotary transmission components, spaced apart around said shaft rotary transmission component.

6. The drive system of claim 2, wherein in each set the rotary transmission components are coaxial and fixed with respect to each other for co-rotation with each other.

7. The drive system of claim 1, wherein said at least one intermediate rotary transmission component intermeshes with said shaft rotary transmission component and said wheel rotary transmission component.

8. The drive system of claim 7, wherein said at least one intermediate rotary transmission component is provided in one or more sets, and wherein each set of rotary transmission components comprises a first rotary transmission component intermeshing with said shaft rotary transmission component, and a second rotary transmission component intermeshing with said wheel gear.

9. The drive system of claim 1, wherein said at least one intermediate gear is revolvable around said shaft gear by rotation of said carrier with respect to said first drive shaft, and wherein said revolving causes rotation of said at least one intermediate rotary transmission component with respect to the carrier.

10. The drive system of claim 1, wherein said operating mechanism comprises a handle, or other manual operating mechanism, for rotating the carrier, or wherein said operating mechanism comprises a powered actuator for rotating the carrier.

11. The drive system of claim 1, further including at least one other out-of-balance rotating drive shaft.

12. The drive system of claim 11, wherein said first drive shaft and said at least one other out-of-balance drive shaft are coupled together by a mechanical coupling mechanism for transmitting rotation of at least one of said drive shafts to at least one other of said drive shafts.

13. The drive system of claim 12, wherein said at least one other out-of-balance drive shaft comprises a second out-of-balance drive shaft, and wherein said mechanical coupling mechanism being configured to transmit rotation of one of said first and second drive shafts to the other of said first and second drive shafts.

14. The drive system of claim 13, wherein said mechanical coupling mechanism is configured to cause said first and second shafts to rotate in the same direction or in opposite directions.

15. The drive system of claim 1, wherein said rotary transmission system is configured to cause said wheel to rotate in the opposite direction to said first drive shaft.

16. The drive system of claim 1, including a drive mechanism coupled directly or indirectly to said first drive shaft for rotating the first drive shaft.

17. The drive system of claim 12, including a drive mechanism coupled to at least a driven one of said drive shafts for rotating the driven drive shaft.

18. The drive system of claim 1, wherein said rotary transmission system comprises a gear system in which said shaft rotary transmission component comprises a shaft gear fixed with respect to said first drive shaft; said wheel rotary transmission component comprises a wheel gear fixed with respect to said wheel; said at least one intermediate rotary transmission component comprises at least one intermediate gear coupling the shaft gear to the wheel gear for transmitting rotation of the shaft gear to the wheel gear.

19. A material processing apparatus comprising at least one vibrating component and a vibratory drive system for vibrating said at least one vibrating component, wherein said drive system comprises a first rotatable drive shaft having a rotational axis;

an out-of-balance wheel located coaxially with said first rotatable drive shaft and being rotatable relative to said first drive shaft about said rotational axis;

a rotary transmission system coupling the first drive shaft to the wheel in order to transmit rotational movement of the first drive shaft to the wheel, wherein said rotary transmission system comprises:

a shaft rotary transmission component fixed with respect to said first drive shaft;

a wheel rotary transmission component fixed with respect to said wheel;

at least one intermediate rotary transmission component coupling the shaft rotary transmission component to the wheel rotary transmission component for transmitting rotation of the shaft rotary transmission component to the wheel rotary transmission component, wherein said at least one intermediate rotary transmission component is carried by a carrier that is rotatable relative to said first drive shaft about said rotational axis, and wherein said at least one intermediate rotary transmission component is rotatable with respect to the carrier, and wherein the vibratory drive system further includes an operating mechanism for rotating the carrier relative to the first drive shaft.

20. The material processing apparatus of claim 19, wherein said at least one vibrating component comprises at least one screen.

21. A vibratory drive system comprising:

a first rotatable drive shaft having a rotational axis;

an out-of-balance wheel located coaxially with said first rotatable drive shaft and being rotatable relative to said first drive shaft about said rotational axis;

a rotary transmission system coupling the first drive shaft to the wheel in order to transmit rotational movement of the first drive shaft to the wheel,
wherein said rotary transmission system comprises:
- a shaft rotary transmission component fixed with respect to said first drive shaft;
- a wheel rotary transmission component fixed with respect to said wheel;
- at least one intermediate rotary transmission component coupling the shaft rotary transmission component to the wheel rotary transmission component for transmitting rotation of the shaft rotary transmission component to the wheel rotary transmission component, wherein said at least one intermediate rotary transmission component is carried by a carrier that is rotatable relative to said first drive shaft about said rotational axis, and wherein said at least one intermediate rotary transmission component is rotatable with respect to the carrier,
and wherein said rotary transmission system is configured to cause said wheel to rotate in the opposite direction to said first drive shaft.

\* \* \* \* \*